United States Patent [19]

Snook

[11] 3,779,079
[45] Dec. 18, 1973

[54] TEMPERATURE MEASURING SYSTEMS FOR AUTOMOTIVE VEHICLES AND THE LIKE

[75] Inventor: Richard K. Snook, Bridgeton, Mo.

[73] Assignee: Diginetics Incorporated, Bridgeton, Md.

[22] Filed: June 28, 1972

[21] Appl. No.: 267,005

[52] U.S. Cl.............. 73/346, 73/349, 73/362 SC, 73/362.8
[51] Int. Cl...... G01k 1/16, G01k 7/22, G01k 13/02
[58] Field of Search...................... 73/344, 346, 347, 73/349, 362 SC, 362.8

[56] References Cited
UNITED STATES PATENTS

| | | | |
|---|---|---|---|
| 3,044,296 | 7/1962 | Boddy | 73/347 X |
| 3,092,998 | 6/1963 | Barton | 73/362 SC |
| 2,022,440 | 11/1935 | Slough | 73/347 UX |
| 1,695,295 | 12/1928 | Rollins | 73/349 X |

Primary Examiner—Donald O. Woodiel
Assistant Examiner—Frederick Shoon
Attorney—Robert J. Schaap

[57] ABSTRACT

A temperature gauge assembly for easy and convenient installation on automotive vehicles and similar powered devices. The preferred form of the temperature gauge assembly comprises a transmission temperature gauge assembly including a gauge unit and a sender unit. The gauge unit is comprised of an outer housing with an electrically responsive meter mounted therein and is provided for conveneint attachment to the dashboard or other suitable location of the vehicle. One terminal of the meter is electrically connected by means of a C-shaped clamp to a fuse terminal or other electrical member of the vehicle connected operatively to the battery of the vehicle. The other terminal of the meter is electrically connected to a sender unit comprising a second C-shaped clamp which is conveniently disposed about an electrically grounded member of the vehicle in heat exchange relationship to the fluid in which temperature is to be measured. In the case of the transmission temperature gauge, the second C-shaped clamp is connected to one of the fluid lines to the automotive vehicle transmission in order to detect temperature conditions thereof. A diode having proper temperature sensitivity and electrical characteristics is secured to the second C-shaped clamp and is, in turn, connected to the meter. In another embodiment of the invention, means are provided for eliminating variation in the voltage from the generator of the vehicle.

12 Claims, 5 Drawing Figures

PATENTED DEC 18 1973 3,779,079

TEMPERATURE MEASURING SYSTEMS FOR AUTOMOTIVE VEHICLES AND THE LIKE

This invention relates in general to certain new and useful improvements in temperature measuring devices, and more particularly, to temperature measuring devices used on automotive vehicles and the like.

It is well recognized that temperature measurement of certain components of an automotive vehicle will provide an indication of the efficiency of performance of those components. For example, temperature indication of the motor or of the transmission of the vehicle will normally apprise the vehicle operator of the condition of operation of the vehicle and also provide an indication of malfunction or potential malfunction.

In previous years, temperature gauges were normally included in the automotive vehicle and mounted on the dashboard of the vehicle for convenient view by the operator in order to determine the operating temperature of the motor. Thus, if the motor became excessively heated, or did not heat to the proper operating temperature, the operator of the vehicle could recognize this condition and take the corrective action that was necessary.

Most automotive vehicles are now equipped with a warning light or so-called "emergency light," which will only be illuminated when the temperature of the component being measured reaches an excessive value with respect to its normal operating temperature. The warning light is electrically connected to a sensor mechanism which is, in turn, located in heat sensitive relationship to the radiator or other portion of the cooling system of an automotive vehicle. Thus, if the temperature of the coolant in the cooling system becomes excessive, this condition provides an indication that the motor of the vehicle is operating at an excessively high temperature and the warning light will become illuminated. However, in many cases substantial damage is often encountered before the warning light is illuminated since this light normally becomes illuminated only when the temperature reaches the excessive limits.

This problem is particularly pronounced in those vehicles having only warning lights as opposed to temperature gauges and which vehicles are used to pull trailers or other substantial loads. The hauling of loads with a vehicle will place a substantial strain on the transmission of the vehicle, and this is particularly true in cases where the vehicle is equipped with an automatic transmission. The imposition of this strain on the transmission creates a condition where the transmission will operate at a temperature higher than its normal operating temperature. However, high operating temperatures in a transmission can often produce substantial damage to the transmission, often to the point where the transmission is unrepairable. It is well established that abnormal temperature conditions in the transmission must be detected in their incipiency in order to avoid this substantial damage.

In order to obviate these problems of the temperature measurement and readout of various components in the automotive vehicle, there have been several commercially available temperature gauge assemblies which can be installed by the owner of the vehicle. However, each of these assemblies are very complex and require considerable ability on the part of the user to install the assemblies. Generally, the gauges are designed so that they must be installed within an aperture formed in the dashboard or other suitable portion of the vehicle interior. Oftentimes, this requires the user to drill or otherwise form an aperture in the dashboard or other suitable mounting panel. The sensor unit is typically installed on the component where temperature measurement is desired. If temperature measurement of the motor oil or transmission fluid is desired, the user of these commercially available assemblies must tap into the motor block or other engine component and insert a sensor unit into direct contact with the oil or fluid in order to test the temperature of the oil or fluid. In like manner, temperature of the coolants in the cooling system is measured by operatively inserting a sensor unit directly into contact with the coolant. All of these extant systems require considerable mechanical ability for installation in that the sensor unit must be placed in direct contact with the fluid in which the temperature is being measured. Therefore, many users of these systems have had to resort to the assistance of trained automotive vehicle mechanics for purposes of installation thereby substantially increasing the overall cost of the system. Accordingly, these commercially available systems have not been widely accepted.

It is, therefore, the primary object of the present invention to provide a temperature gauge assembly of the type stated which can be constructed for the measurement of transmission temperature, motor temperature, or the like.

It is the further object of the present invention to provide a temperature gauge assembly of the type stated which is relatively simple in its construction and which is yet highly efficient in its operation.

It is an additional object of the present invention to provide a temperature gauge assembly of the type stated which is constructed with a minimum number of mechanical and electrical components and therefore can be produced and sold at a low unit cost.

It is another salient object of the present invention to provide a temperature gauge assembly where the meter portion of the assembly may be highly decorative and can be manufactured to conform to the decor of the vehicle interior.

With the above and other objects in view, my invention resides in the novel features of form, construction, arrangement and combination of parts presently described and pointed out in the claims.

Generally speaking, the present invention resides in a temperature gauge assembly which comprises a meter unit and a sender unit. The meter unit is provided with an outer housing for holding a meter or other readout device capable of operating in response to electrical current or voltage. The housing is provided with flange plates or other securement means for convenient attachment to the dashboard or other portion of the vehicle where the meter is readily viewable by the operator of the vehicle.

Connected to one terminal of the meter through a first electrical conductor is a first attachment means such as a clamping member which is preferably in the form of a C-shaped clamp. This clamp is designed so that it can be conveniently snapped over or otherwise secured to the terminal end of one of the fuses or other similar electrical conductor in the vehicle which is operatively connected to the positive terminal of the vehicle battery. The second terminal of the meter is connected through another electrical conductor to the sender unit.

The sender unit also comprises a second attachment means or clamping member, preferably in the form of a C-shaped clamp. This clamp is also designed to be conveniently attached to a fluid line in the vehicle which carries the fluid in which the temperature is to be measured. Thus, if the temperature of the transmission is to be measured, the second clamping member would be attached to the coolant line located in heat exchanging relationship to the transmission. A temperature sensitive, electrically conductive member is physically mounted on the second clamping member for detecting the temperature of this fluid carried in the cooling line. In this way, the second clamping member serves a plurality of functions in that it provides a means for attachment to a member in heat conductive relationship to the physical variable to be measured, it serves as a heat conductor ser-se, and also as a means of transmitting electrical signals generated in response to the temperature measurement.

A modified form of circuit used on the meter portion of the assembly employs a Zener diode in combination with a current limiting resistor in order to maintain a constant voltage across the meter. In this way, a voltage measuring meter can be used in place of the current sensitive meter. An amplifier is connected in combination with this Zener diode and current limiting resistor and serves as an impedance buffer.

In the accompanying drawings (one sheet):

Figure 1:
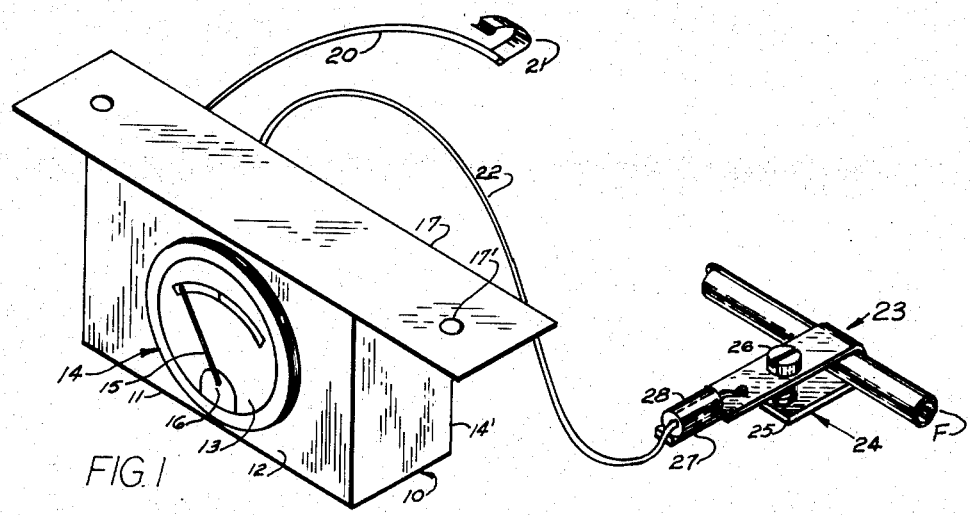
FIG. 1 is a schematic perspective view of a temperature gauge assembly constructed in accordance with and embodying the present invention.

Referring now in more detail and by reference characters to the drawings, FIG. 1 illustrates a gauge unit 10 comprising an outer housing 11 which is capable of being suitably mounted on the dashboard or other portion of an automotive vehicle interior. The outer housing 11 generally comprises a vertically disposed front wall or facing wall 12 which is suitably apertured to expose the dial face 13 of an electrical readout meter 14. A pair of spaced apart transverse side walls 14' are integrally formed with the opposite ends of the front wall 12 to form a portion of an enclosing side wall. This meter 14 is normally mounted within the housing 11 by any suitable means such as brackets or the like (not shown) and may be also retentively held in place by means of suitable adhesives such as epoxy, resins or the like. The dial face 13 is conveniently provided with a scale and a needle 15 operatively connected to and operable by the meter movement for pivoting around a pivot pin 16. In this manner, the needle 15 will shift along the scale in response to the temperature of the fluid or other physical variable which is being measured. Integrally formed with or otherwise rigidly secured to the top wall of the housing 11 are a pair of longitudinally extending flange plates 17 which are provided with mounting apertures 17 for receiving sheet metal screws or other fasteners in which the housing 11 may be secured to any conventional portion of the vehicle interior.

While the meter unit 10 has been constructed so that it is mounted in a normally upright position, it should be recognized that the meter can be constructed in a manner where it will be horizontally disposed so that the dial face 13 is presented upwardly or in any other suitable position. Furthermore, the present invention is not limited to the exact form of housing illustrated and any suitable means for retentively carrying the meter may be employed. The housing 11 may be stamped from sheet metal, or otherwise metal formed from a suitable sheet metal such as magnesium, aluminum, steel or the like. In like manner, the housing 11 may be constructed from any suitable plastic material in any of a number of conventional molding operations and include such materials as polyethylene, polystyrene, polyvinylchloride and similar types of moldable plastics.

Figure 2:
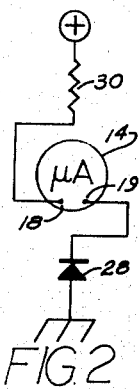
FIG. 2 is a schematic view of an electrical circuit which is used in conjunction with the temperature gauge assembly of FIG. 1.

Projecting rearwardly from the back wall of the meter 10 are a pair of electrical positive and negative mounting terminals 18 and 19 (shown schematically in FIG. 2). Secured to the positive terminal 18 is a current carrying conductor 20 which is electrically connected at its other end to a C-shaped clamp 21 or other form of clamping member which may be connected to some portion of the electrical system of the vehicle which is, in turn, connected to the positive terminal of the vehicle battery. The C-shaped clamp 21 is preferably formed of copper, aluminum or other electrically conductive metal and is sufficiently thin and resilient so that it can be snap fitted over a current conducting member such as a fuse terminal. In this way, the positive terminal 18 of the meter is connected directly to a positive potential from the battery by merely snap-fitting the clamp 21 over a fuse terminal.

The negative terminal 19 is connected through a second current carrying conductor 22 and which is also electrically connected at its opposite end to a sender unit 23 in the manner as illustrated in FIG. 1.

The sender unit 23 is also preferably formed of a metal which is both a good electrical conductor and a good heat conductor and which also has sufficient structural integrity for purposes of structural mounting and would include such metals as brass, aluminum, copper, or the like. The sender unit 23 comprises a C-shaped clamp 24 which is provided with a pair of vertically aligned apertures 25 in the opposed spaced apart legs. The apertures 25 are sized to removably receive a bolt, screw, or other mechanical member 26 for purposes of snugly holding the clamp 24 around a fluid conducting member F such as a tube carrying a fluid in the manner as illustrated in FIG. 1. Thus, the clamp 24 can be inserted around the fluid conductive member F and retentively held thereon by means of the mechanical member 26. The sender unit 33 has been illustrated as being connected to a fluid conductor such as a coolant line to a component such as the transmission leading from a heat exchanger such as the radiator of the vehicle. However, it should be understood that the clamp 24 could be constructed in any form for convenient attachment to another portion of the vehicle in heat conductive relationship to the fluid in which the temperature is to be measured.

The C-shaped clamp 24 is integrally formed with an expanded retaining flange 27 and secured to the surface thereof is a suitable temperature sensor 28 which is electrically connected to the conductor 22. The temperature sensor 28 is preferably a heat responsive mechanism such as a diode with suitable leakage current versus temperature characteristic and is preferably soldered to the surface of the extended mounting flange 27. Thus, by means of the above outlined construction, it can be observed that the sender unit 23 can be conveniently and quickly installed on a fluid conveying tube which carries a fluid in which the temperature is to be measured. The clamp 24 is conveniently slipped over the tube which will normally by maintained at approximately the same temperature of the fluid which is transported in this tube. Since the clamp 24 is formed of a heat conductive metal, the temperature of the tube and hence of the temperature of the fluid conveyed in the tube will be quickly sensed by the temperature sensor 28. It can be observed that the sender unit 23 serves a variety of unique functions in that it provides a means of mechanically connecting the temperature sensor to the exterior of a member carrying the fluid in which temperature is to be measured without requiring direct physical contact with the fluid. In addition, the sender unit 23 provides a means of generating an electrical temperature indicating signal in response to the temperature of the fluid connected in the fluid pipe. Further, the clamp 24 serves as a means of conducting the heat from the pipe F to the sensor 28 without requiring a physical insertion of the sensor 28 directly into the pipe.

The sensor 28 essentially modulates the current flow to the meter 14 and which is connected in an electrical path across the positive and negative terminals of the vehicle electrical system such as the generator, battery or the like. Thus, this current flow to the meter 14 is monitored by and controlled in response to the temperature sensed by the sensor 28.

The meter unit 10 is also conveniently mounted in the vehicle by using sheet metal screws or other mechanical factors (not shown) extending through the apertures 17 on the mounting flanges 16. Finally, the clamp 21 is conveniently installed in the manner as aforesaid thereby completing the electrical circuit to the meter.

FIG. 2 illustrates an electrical circuit used in conjunction with the meter assembly FIG. 1. The temperature sensor 28 in the form of the diode is shown as being electrically connected to ground since the clamp 24 is connected to the fluid carrying tube F which is, in turn, grounded to the structural elements of the vehicle. In this way, the clamp 24 serves as a suitable means of providing an electrical ground. The temperature sensor 28 is connected directly to the meter 14 as illustrated, and the positive terminal of the meter is connected through a current limiting resistor 30 to a positive source of voltage, such as through the clamp 21. As stated previously, the clamp 2 is connected to a fuse terminal or other member which is, in turn, operatively connected to the positive terminal of the vehicle battery.

Figure 3:
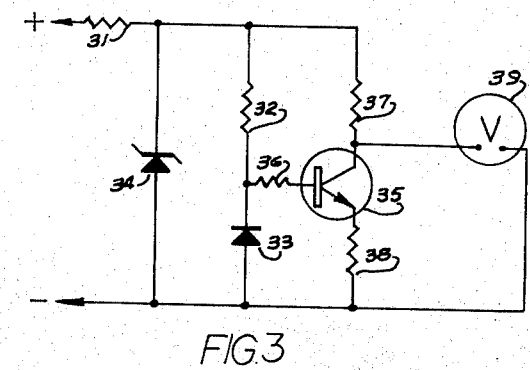
FIG. 3 is a schematic view of a modified form of electrical circuitry which can be used in the temperature gauge assembly of FIG. 1.

FIG. 3 illustrates a modified form of electrical circuit which is used in conjunction with the meter assembly of FIG. 1. In this modified form of electrical circuit, the clamp 21 is connected through a connecting resistor 31, to one terminal of a current limiting resistor 32 which, in turn, is connected to the temperature sensing diode 33 and this diode 33 is substantially identical to the diode 28. The opposite terminal of the diode 33 is grounded in the manner as illustrated in FIG. 3. The connecting resistor 31 is also connected to a Zener diode 34 which is also connected to the grounded terminal of the temperature sensing diode 33 and to the common connection of the connecting resistor 31 and the current limiting resistor 32. An amplifier in the form of an NPN transistor 35 is connected across the temperature sensing diode 33 in order to amplify the signal therefrom. The base of this amplifier 35 is connected through a base resistor 36 to the common terminal between the current limiting resistor 32 and a temperature sensing diode 33. The collector of the transistor 35 is connected through a collector resistor 37 to the common terminal between the connecting resistor 31 and the current limiting resistor 32. Finally, the emitter of the transistor 35 is connected through an emitter resistor 38 to ground in the manner as illustrated in FIG. 3. A meter 39, which is somewhat similar to the previously described meter 13, is connected to the collector of the transistor 35 and the across the grounded terminal of the emitter resistor 38. However, the meter 39 is preferably a voltage responsive meter as opposed to a current responsive meter.

In most automotive vehicle electrical systems, a normal fully charged battery generates a nominal voltage of approximately 13.2 volts which will fluxuate approximately between 12 and 14 volts. However, in vehicles with generators, this voltage can fluxuate considerably depending on the speed of operation of the generator which, in turn, is regulated by the speed of operation of the motor. Accordingly, a Zener diode and associated current limiting resistor may be provided to present a constant potential to the metering circuit. It can be observed that the potential is applied across the fixed resistor 32 in series with the temperature sensing diode 33. Accordingly, the potential drop across this diode 33 is a linear function of temperature and the signal is amplified by the transistor amplifier 35. It should be observed that the shunt path does not materially contribute to any current drop across line containing the current limiting resistor 33 and the temperature sensing diode 33. Furthermore, it can be observed that through this circuit, it is possible to use a voltmeter as opposed to an ammeter as a form of meter movement in which to depict temperature condition.

Figure 4:
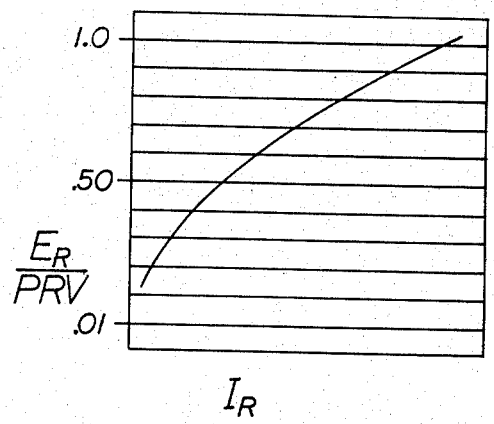
FIG. 4 is a diagrammatic view of a graph showing the leakage current of the temperature sensor as a function of the ratio of reverse voltage to peak reverse voltage.
Figure 5:
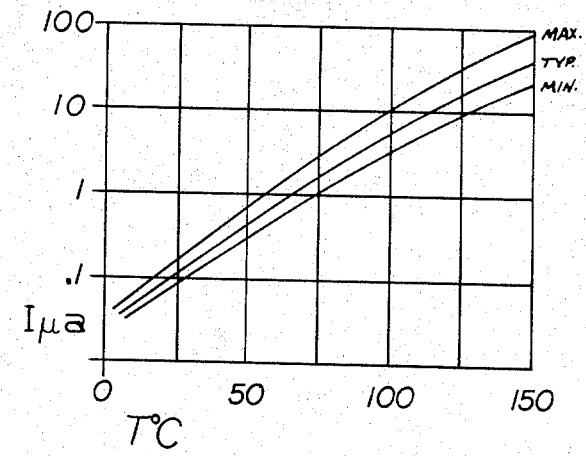
FIG. 5 is a diagrammatic view of a graph showing current limiting resistance as a function of temperature in the temperature sensor forming part of the temperature gauge assembly.

It has been found in connection with the present invention that germanium junction diodes are highly suitable for use as temperature sensors since they have a high leakage current. In fact, the germanium diode described as the IN662 diode has been found to be highly effective for use in the present temperature gauge assembly. FIG. 4 is a diagrammatic view of the reverse current IR as a function of the ratio of reverse voltage ER to peak reverse voltage PRV at a constant temperature. FIG. 5 illustrates in diagrammatic form a graph showing the reverse current or leakage current in microamperes and designated Iua as a function of temperature in degrees C and illustrates the minimum and maximum reverse current efficiencies as a function of temperature, as well as the typical reverse current efficiency. It can be observed that when comparing this diagram to the diagrammatic view of FIG. 4 that the function of the reverse current is almost linear with respect to reverse voltage. In this way, it is possible to select a temperature sensing diode which will have a high leakage current substantially linear with respect to the temperature at any desired voltage level.

Thus, there has been shown and described a novel temperature gauge assembly which can be made at a relatively low cost and used in a wide variety of applications and which therefore fulfills all of the objects and advantages sought therefore. Many changes, modifications, variations and other uses and applications of the temperature gauge assembly will become apparent to those skilled in the art after considering this specification and the accompanying drawings. All such changes, modifications, variations and other uses and applications which do not depart from the spirit and scope of the invention are deemed to be covered by the invention which is limited only by the claims which follow.

Having thus described my invention, what I desire to claim and secure by letters patent is:

1. A temperature measuring system for measuring and depicting the temperature of a fluid in an automotive vehicle and which vehicle has a source of electrical power with first and second electrical terminals; said system comprising the combination of gauge means, mounting means on said gauge means permitting operative attachment to said vehicle in a location where it is viewable by an operator of said vehicle, first and second electrically conductive terminal mounts on said gauge means, first conductor means having one end connectable to said first electrically conductive terminal mount, first electrically conductive attachment means on said first conductor means for attachment to a member on said vehicle in electrically conductive relationship to said first electrical terminal, second conductor means having one end connectable to said second electrically conductive terminal mount, second electrically conductive and heat conductive attachment means on the other end of said second conductor means for attachment to the exterior surface of a member in heat conductive relationship to said fluid, said last named member also being in electrically conductive relationship to said second electrical terminal to thereby create an electrical current flow through said first and second attachment means and said first and second conductor means and said gauge means, said second attachment means being adapted with proper size to be attached only to the exterior surface of said member to sense the temperature of said fluid by heat conductivity through said member and without having any portion thereof in contact with said fluid, and temperature sensing means carried by said second attachment means and being in heat conductive disposition on said second attachment means and in electrically conductive relationship thereto for sensing the effect of the temperature of said member in heat conductive relationship with said fluid, said temperature sensing means being located on said second attachment means to be in close proximity to the member in heat conductive relationship to said fluid, said temperature sensing means being capable of modulating the said electrical current flow for transmission to said gauge means in response to the temperature of the member in heat conductive relationship with said fluid.

2. The temperature measuring system of claim 1 further characterized in that said first attachment means is a C-shaped clamp capable of attachment to a fuse terminal or similar member.

3. The temperature measuring system of claim 1 further characterized in that said second attachment means is a clamp capable of attachment to a fluid carrying member which carries the fluid where temperature is to be measured.

4. The temperature measuring system of claim 1 further characterized in that said temperature sensing means is a temperature responsive diode which is capable of modulating an electrical current in response to the temperature thus sensed.

5. The temperature measuring system of claim 1 further characterized in that said second attachment means is a clamp which is formed of a metal having good heat conductive properties and electrically conductive properties.

6. The temperature measuring system of claim 1 further characterized in that said temperature sensing means is a germanium diode.

7. The temperature measuring system of claim 1 further characterized in that current limiting electrical circuit means is operatively interposed with said temperature sensing means and said gauge means.

8. The temperature measuring system of claim 7 further characterized in that said gauge means comprises a current sensitive meter, and said electrical circuit means comprises a current limiting resistor interposed between said meter and said temperature sensing means.

9. The temperature measuring system of claim 7 further characterized in that said gauge means comprises a meter operable by an electrical signal and a voltage stabilizing circuit operative to prevent electrical potential variance from said source of electrical power from affecting readings on said meter.

10. A temperature measuring system for measuring and depicting the temperature of a fluid in an automotive vehicle and which vehicle has a source of electrical power with first and second electrical terminals; said system comprising the combination of gauge means, mounting means on said gauge means permitting operative attachment to said vehicle in a location where it is viewable by an operator of said vehicle, first and second electrically conductive terminal mounts on said gauge means, first conductor means having one end connectable to said first electrically conductive terminal mount, first electrically conductive attachment means on said first conductor means for attachment to a member on said vehicle in electrically conductive relationship to said first electrical terminal, second conductor means having one end connectable to said second electrically conductive terminal mount, second attachment means in the form of a C-shaped clamp formed of a metal having good heat conductive properties and electrically conductive properties, said second attachment means being located on the other end of said second conductor means for attachment to the exterior surface of a member in heat conductive relationship to said fluid, said last named member also being in electrically conductive relationship to said second electrical terminal to thereby create an electrical current flow through said first and second attachment means and said first and second conductor means and said gauge means, and temperature sensing means carried by said second attachment means and being in heat conductive disposition on said second attachment means and in electrically conductive relationship thereto for sensing the effect of the temperature of said member in heat conductive relationship with said fluid, said temperature sensing means being located on said second attachment means to be in close proximity to the member in heat conductive relationship to said fluid, said temperature sensing means being capable of modulating the said electrical current flow for transmission to said gauge means in response to the temperature of the member in heat conductive relationship with said fluid.

11. The temperature measuring system of claim 10 further characterized in that said C-shaped clamp is capable of attachment to a fluid carrying member which carries the fluid where temperature is to be measured.

12. The temperature measuring system of claim 10 further characterized in that said temperature sensing means is a temperature responsive diode which is capable of modulating an electrical current in response to the temperature thus sensed.

* * * * *